Aug. 26, 1930.  C. G. MILLER  1,774,449
DENTAL BRIDGE
Original Filed Sept. 18, 1925
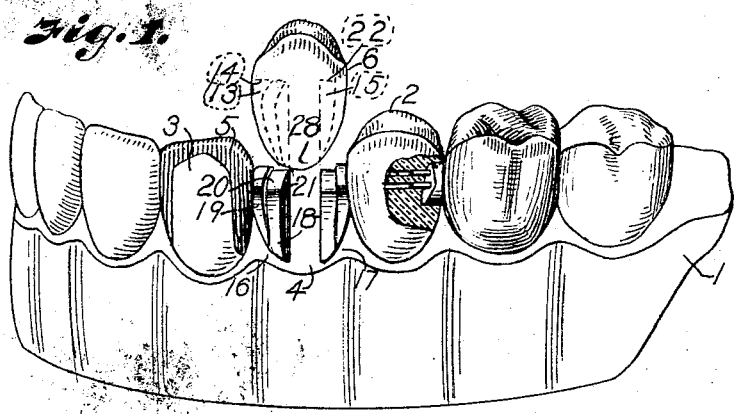
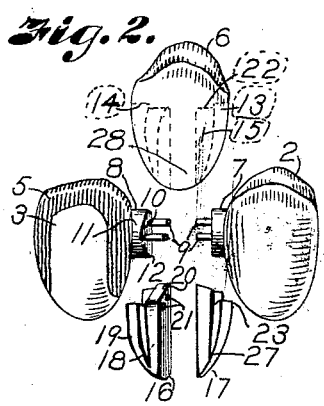
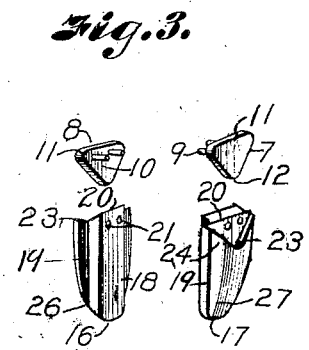
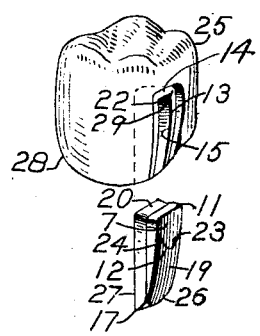
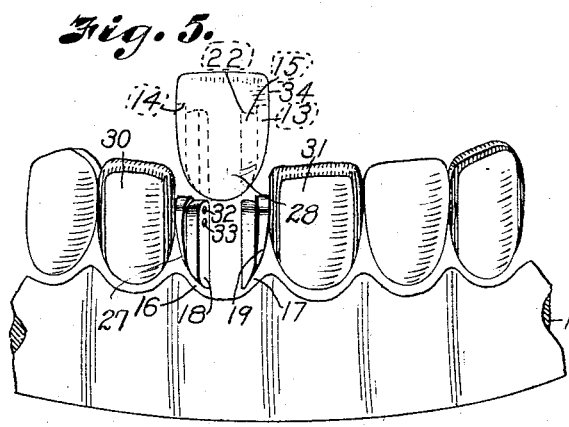
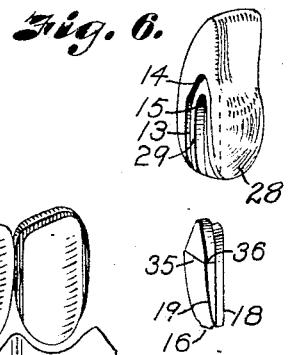
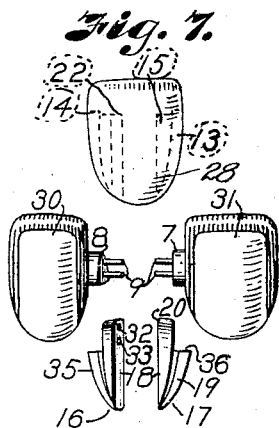
INVENTOR.
Clement G. Miller
BY Arthur C. Brown
ATTORNEY Patented Aug. 26, 1930

1,774,449

UNITED STATES PATENT OFFICE

CLEMENT G. MILLER, OF KANSAS CITY, MISSOURI

DENTAL BRIDGE

Original application filed September 18, 1925, Serial No. 57,152. Divided and this application filed June 20, 1928. Serial No. 286,989.

My invention relates to dental bridges and more particularly to means for supporting an artificial tooth from adjacent teeth, the principal objects of the invention being to support an artificial tooth from the mesial and distal portions of adjacent teeth, to minimize the amount and extent of metal required for a bridge, and particularly to provide means for mounting an all porcelain tooth in a dental bridge.

The present application is a division of my co-pending application Serial No. 57,152, filed September 18, 1925, wherein a bridge was disclosed including an artificial tooth having sockets in its mesial and distal portions, and a retaining member provided with portions receivable by said sockets and opposite portions adapted to be soldered to abutments for supporting the tooth from the abutments.
When an artificial tooth is broken, or removed, whether supported by means disclosed in said application, or by other usual retaining means in fixed bridge work, the supporting members must ordinarily be removed from their intimate engagement with abutments in order that said members, or similar ones, may be suitably adjusted to and engaged with the replacing tooth.

A further object of my invention, therefore, is to facilitate the replacement of a bridge tooth, and particularly to provide means for mounting a replacement tooth on retaining members already secured to abutments, and anchoring the replacement tooth.
In accomplishing these and other objects of the invention I have provided improved details of structure, the preferred forms of which are illustrated in the accompanying drawings, wherein:

Fig. 1 is a perspective front view of an inverted tilted model of upper human teeth illustrating a posterior upper bridge embodying my invention, a replacement tooth being illustrated as separated from the support and in position for installation.

Fig. 2 is a perspective view of spaced teeth provided with retainers, and supporting members and a replacement tooth in position for mounting on retainers.

Fig. 3 is a slightly enlarged perspective view of the retainers and supporting members in positions similar to those shown in Fig. 2.

Fig. 4 is a perspective view of a molar tooth illustrating the groove and socket in the mesial side of the tooth, and a supporting member for engagement therewith to retain it in position.

Fig. 5 is a perspective front view of an inverted model of upper teeth similar to Fig. 1, but illustrating an anterior upper bridge, a replacement tooth being shown in position for installing on the supporting members.

Fig. 6 is a detail perspective view from the lingual and mesial sides of an upper anterior replacement tooth and a supporting member therefor, shown related but separated.

Fig. 7 is a detail perspective view of the bridge shown in Fig. 5, the support and replacement tooth being shown separated from the abutments and retainers.

Referring in detail to the drawings:

1 designates a portion of a denture, 2 an artificial bicuspid, 3 a natural incisor spaced from the bicuspid by an interval 4, the incisor being illustrated as provided with an artificial replacing portion 5, such as a gold inlay constituting an abutment. The bicuspid and incisor comprise supports for an artificial tooth 6, as presently described, to occupy the interval 4, the artificial tooth in this instance being a bicuspid. Retainers 7 and 8 provided with projecting pins 9 are respectively attached by suitable means such as soldering to the teeth 2 and 3. The retainers may primarily be provided as set forth in the application above referred to by imbedment in opposite sides of an artificial tooth for securing such tooth to the supporting teeth by attaching the retainers to the adjacent surfaces of the teeth. Should an artificial tooth supported by the retainers be broken, the retainers may remain attached to the supporting teeth and comprise elements of a support for a substitute or replacement artificial tooth to replace the broken tooth.

The retainers are similar, each comprising a body 10 having an angular and preferably triangular periphery including an occlusal edge or shoulder 11 and an oppositely extending point portion 12, the occlusal edge extending horizontally and the point portion extending gingivally.

The artificial tooth 6 is adapted for mounting between the teeth 2 and 3 on the retainers for support thereby and for this purpose said tooth is provided with vertical grooves or countersunk channels 13 in its mesial and distal sides, the grooves having widths substantially equal to the lateral dimensions of the retainers in installed position and extending from the gingival end of the tooth and terminating in stop walls 14 for engagement with the occlusal edges of the retainers. Additional grooves 15 are provided countersunk in the bottoms of the grooves 13 to permit passage of the tooth over the protruding pins 9, a single groove 15 being preferably provided in each side of the tooth and wider than necessary merely to admit the pins, for a purpose presently disclosed.

Supporting and retaining members 16 and 17 constituting a feature of the present invention, are provided for engagement with the retainers 7 and 8 for additionally anchoring and supporting the tooth 6, and the tooth is adapted for mounting on and engagement with the members 16 and 17.

The members 16 and 17 are similar, each comprising a body 18 receivable in the inner groove 15 on one side of the tooth 6 and a flange-like plate 19 attached to the outer face of the body and which may be integral therewith.

The body 18 is narrower than the retainer with which it is associated but sufficiently wide to overlie the pins 9 laterally and has an upper edge 20 adapted to be spaced slightly below the upper limit of the upper edge of the retainer, and openings 21 to receive the pins 9, the body being preferably of such thickness that the pins may extend substantially therethrough.

The inner grooves 15 of the tooth 6 are widened as above suggested for receiving the bodies 18 of the members 16 and 17 and the upper edges 20 of the body portions abut the upper walls 22 of the grooves 15. The plates 19 on the outer faces of the bodies are provided with notches 23 producing wings 24 adapted to receive and engage the gingival portions of the peripheries of the retainers, the gingival point portion 12 of a retainer seating in the notch of a plate. The plates 19 have substantially the same thickness at their upper ends as the retainers to fill the space between the bodies 18 and the pier teeth.

The structure recited provides, therefore, that a supporting member, such as 17, Fig. 2, may be mounted on a retainer, such as 7, with the pins 9 of the retainer extending into the openings 21 of the body and the notched plate engaging the lower portion of the retainer, the complementary support 16 being similarly mounted on the retainer 8 and bridge tooth 3.

The grooved replacement tooth 6 may then be mounted on the assembled support, the several parts and members being suitably attached to adjacent parts. For example, the apertured body with the attached plate may be threaded on the pins and the plate and body cemented to the retainer, and the tooth slidingly mounted over the supporting assembly and cemented thereto.

Attention is called to the specific construction and arrangement of the installation just described, wherein the retainers are illustrated as triangular and positioned with occlusal sides extending substantially horizontally, the pins being positioned horizontally in the retainers and the opposite sides meeting at a point toward the gingival edge.

In Fig. 4 the groove 13 in the mesial side of a replacement molar 25 has a substantially horizontal occlusal stop wall 14 for engaging the occlusal edge of a retainer and the pins 9 of the retainer are positioned in horizontal alignment, the groove 15 in the tooth being adapted to permit passage of the pins upon mounting of the tooth on the abutment-engaged retainers. The point portion 12 of the retainer is received by the triangular notch 23 in the plate 19.

A plate portion 19 is preferably originally rectangular and has equal thickness throughout its length, and the body member 18 is also rectangular and likewise has equal thickness throughout its length.

The plate portions 19 are suitably grouped and tapered toward their gingival ends as at 26, when installed, to reduce both thickness and width for conformity to the contour of the laterally tapering gingival end 28 of a replacement tooth, and the body members may also be tapered for the same purpose, as indicated at 27, so that the auxiliary members 16 and 17 are countersunk in the replacement tooth. The shoulders 29 produced by the countersinking of the grooves 15 in the bottoms of the grooves 13 extend substantially in a vertical plane to receive plates 19. The grooves 13 have lessening depth toward their open gingival ends, due to the degree of convexity of the replacement tooth used, and the size of the tooth.

The supporting members may be adapted for any bridge position and a replacement tooth may be adapted to the altered arrangement of the retainers and auxiliary supports, Figs. 5 and 6 illustrating such an adaptation.

Fig. 5 illustrates another form of the bridge wherein spaced incisors 30 and 31 are provided with retainers having vertically aligned pins represented by the aligned openings 32 and 33 in the body member of the auxiliary support, such arrangement being preferable in view of the relative narrowness of the mesial and distal sides of incisors and the replacement incisor 34 being provided with correspondingly narrow grooves.

Fig. 6 illustrates an incisor wherein the grooves are relatively narrow due to the shape of the tooth and the retainers are positioned with one side 35 comprising a gingival edge extending horizontally, the plate 19 in this case having a horizontal edge 36 to receive the retainer.

Fig. 7 illustrates the position and form of retainers adapted for attachment to abutments of teeth having relatively narrow mesial and distal sides, the pins extending in vertical alignment, the bodies of the auxiliary supports being relatively narrow and the plates having horizontal edges whereby the relatively thin replacement tooth may be provided with comparatively narrow grooves.

In using the invention an artificial replacement tooth is provided suitable for the position it is to occupy and the auxiliary supporting members are provided adapted to fit on and engage the retainers already supported by the abutments of spaced teeth.

The replacement tooth is provided with grooves suitable for mounting it on the assembled support including the retainers and the auxiliary members. The auxiliary members are cemented to the retainers already attached to the abutments, and the replacement tooth is installed on these supports and properly secured thereto.

What I claim and desire to secure by Letters Patent is:

1. In a bridge, in combination with spaced abutments and retainers attached to the abutments and having protruding pins, anchoring members having openings to receive the pins for support of the anchoring members from the retainers, and wing plates adapted to receive the body portions of the retainers, and a replacement tooth having grooves for receiving the retainers and anchoring members.

2. In a bridge, in combination with spaced abutments and retainers attached to the abutments and comprising shaped body portions provided with protruding pins, anchoring members having openings to receive the pins for support of the anchoring members from the retainers, and wing plates adapted to engage the body portions of the retainers, and a replacement tooth having grooves for receiving the retainers and countersunk grooves for receiving the anchoring members.

3. In combination with a bridge including spaced abutments, retainers engaged with the abutments, and a replacement tooth receivable by the retainers for support from the abutments, anchors having means for engaging the retainers and adapted to receive the tooth for anchoring the tooth in abutment-supported position.

4. In combination with a bridge including abutments, retainers engaged with the abutments, and a grooved tooth adapted to engage the retainers for support thereby, tooth-anchoring means including a member engageable with an abutment-engaged retainer for support thereby and having means for engagement with the tooth.

5. In combination with a bridge including an abutment, a retainer secured to the abutment in fixed position and protruding horizontally therefrom, and a replacement tooth, tooth-anchoring means including a plate movable horizontally over the retainer into engagement therewith and adapted for engaging the tooth.

6. In combination with a bridge including spaced abutments and retainers secured to the abutments, anchoring means including a member movable into engagement with one of the secured retainers, and a replacement tooth slidably engageable with the retainers and having a groove for engagement with said retainer-engaged member.

7. In a bridge including spaced abutments, tooth supports attached to the abutments including vertical body portions and vertical plate portions having edges extending beyond the body portions, said plate portions having substantial thickness whereby they are adapted to afford support for a tooth, and a tooth having vertical grooves to receive the edges of the plate portions and vertical grooves in the bottoms of the first named grooves to receive the body portions, said tooth having stop walls at the ends of said grooves in the occlusal third of the tooth to receive the occlusal edges of the supports for supporting the tooth from the abutments.

8. In a bridge including spaced abutments, retainers protruding horizontally from the abutments and fixed thereto, and a tooth having vertical grooves provided with the transverse stop walls, anchoring means adapted to be mounted on the fixed retainers and including portions receivable in the grooves of the tooth, one of said portions being adapted to engage one of said stop walls, whereby the tooth may be mounted on the assembled retainers and anchoring means for support from the abutments.

9. In combination with a tooth having stop walls in its occlusal third to receive corresponding edges of a supporting bridge, a bridge including an abutment, a support for the tooth including a retainer attached to the abutment, a tapered plate extending from the retainer toward the gingival end of the tooth mounted on the support, and a body having vertical edges spaced inwardly from the edges of the plate.

In testimony whereof I affix my signature.

CLEMENT G. MILLER.